United States Patent [19]
Boyd

[11] Patent Number: 6,058,846
[45] Date of Patent: May 9, 2000

[54] ROCKET AND RAMJET POWERED HYPERSONIC STEALTH MISSILE HAVING ALTERABLE RADAR CROSS SECTION

[75] Inventor: Robert R. Boyd, Palmdale, Calif.

[73] Assignee: Lockhead Martin Corporation, Palmdale, Calif.

[21] Appl. No.: 09/089,635

[22] Filed: Jun. 3, 1998

[51] Int. Cl.[7] .............................. F42B 15/10; F02K 3/00; F02K 7/00; F02K 9/00; F02K 9/28
[52] U.S. Cl. ............................... 102/374; 60/245; 60/251
[58] Field of Search ..................... 102/374, 379, 102/380, 381; 60/245, 251

[56] References Cited

U.S. PATENT DOCUMENTS

| | | | |
|---|---|---|---|
| 2,684,570 | 7/1954 | Nordfors | 60/245 |
| 3,157,123 | 11/1964 | Matheson, Jr. | 244/3.22 |
| 3,167,016 | 1/1965 | Czerwinski et al. | 244/3.23 |
| 3,452,544 | 7/1969 | Glick et al. | 60/254 |
| 3,609,977 | 10/1971 | McCormick | 60/245 |
| 3,659,424 | 5/1972 | Polk, Jr. | 60/269 |
| 4,291,533 | 9/1981 | Dugger et al. | 60/240 |
| 4,327,884 | 5/1982 | Lawhorn | 244/3.1 |
| 4,502,649 | 3/1985 | Botwin et al. | 244/3.1 |
| 4,628,688 | 12/1986 | Keirsey | 60/251 |
| 4,651,523 | 3/1987 | Adams | 60/245 |
| 4,802,639 | 2/1989 | Hardy et al. | 244/2 |
| 4,807,435 | 2/1989 | Moll | 60/253 |
| 4,811,308 | 3/1989 | Michel | 367/136 |
| 4,891,938 | 1/1990 | Nagy et al. | 60/245 |
| 5,135,184 | 8/1992 | Billig | 244/53 R |
| 5,174,524 | 12/1992 | Amneus, III | 244/53 B |
| 5,205,119 | 4/1993 | Bulman | 60/269 |
| 5,224,344 | 7/1993 | Keirsey et al. | 60/244 |
| 5,250,950 | 10/1993 | Scherrer et al. | 342/2 |
| 5,311,774 | 5/1994 | Sava et al. | 73/147 |
| 5,327,721 | 7/1994 | Bulman | 60/269 |
| 5,413,859 | 5/1995 | Black et al. | 428/408 |
| 5,485,787 | 1/1996 | Bowcutt et al. | 102/374 |
| 5,513,571 | 5/1996 | Grantz et al. | 102/374 |
| 5,560,569 | 10/1996 | Schmidt | 244/117 R |
| 5,594,216 | 1/1997 | Yasukawa et al. | 181/213 |
| 5,683,225 | 11/1997 | Orlando et al. | 415/155 |
| 5,721,553 | 2/1998 | James | 342/165 |
| 5,808,577 | 9/1998 | Brinsfield | 342/45 |
| 5,850,285 | 12/1998 | Hill, Jr. et al. | 356/311 |
| 5,853,143 | 12/1998 | Bradley et al. | 244/3.21 |

FOREIGN PATENT DOCUMENTS

| | | | |
|---|---|---|---|
| 1008926 | 5/1952 | France | 102/374 |
| 2554 | 1/1877 | United Kingdom | 12/374 |

Primary Examiner—Michael J. Carone
Assistant Examiner—Fredrick T. French, III
Attorney, Agent, or Firm—Robert A. Schruhl

[57] ABSTRACT

A missile adapted for flight at hypersonic velocities includes an engine operable in rocket and ramjet modes of operation, the engine having an inlet opening, a fuel combustion chamber in the engine housing a boost fuel and a cruise fuel, an axially movable plug located at the engine inlet opening for opening and closing the inlet opening, and a mechanism, coupled with the plug and the engine, for switching between the two modes of operation of the engine during flight of the missile. In this way, when the missile reaches a target location in its flight trajectory, the plug can be moved to close the inlet opening and shut down the ramjet operation, while also minimizing the missile radar cross section properties. The switching mechanism includes sensors for determining flight parameters and a computer for processing the flight parameters to determine when to move the plug. To achieve low weight and improved thermal protection properties, the outer skin and internal structural components of the missile are made from a cured carbon/carbon slurry.

10 Claims, 1 Drawing Sheet

FIG. 1
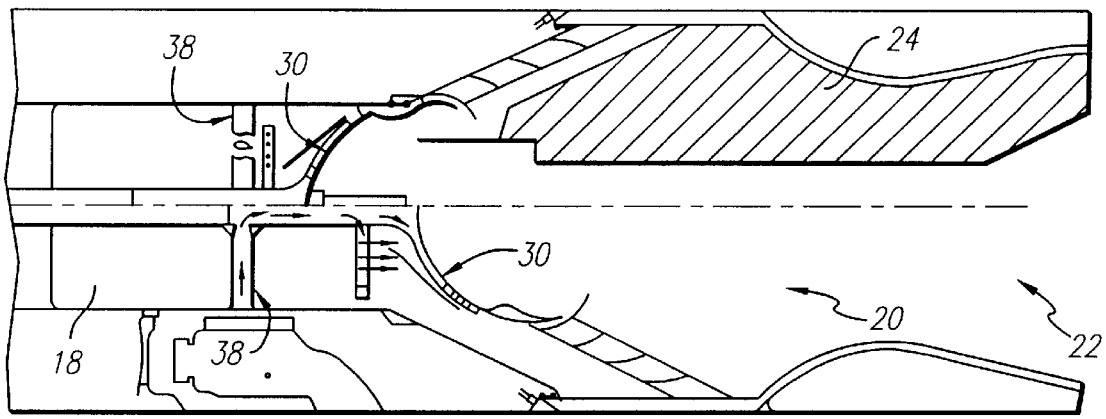
FIG. 2
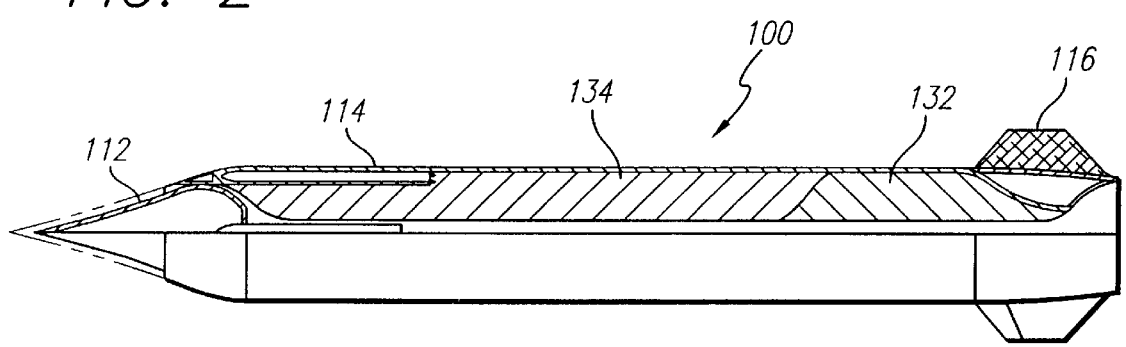
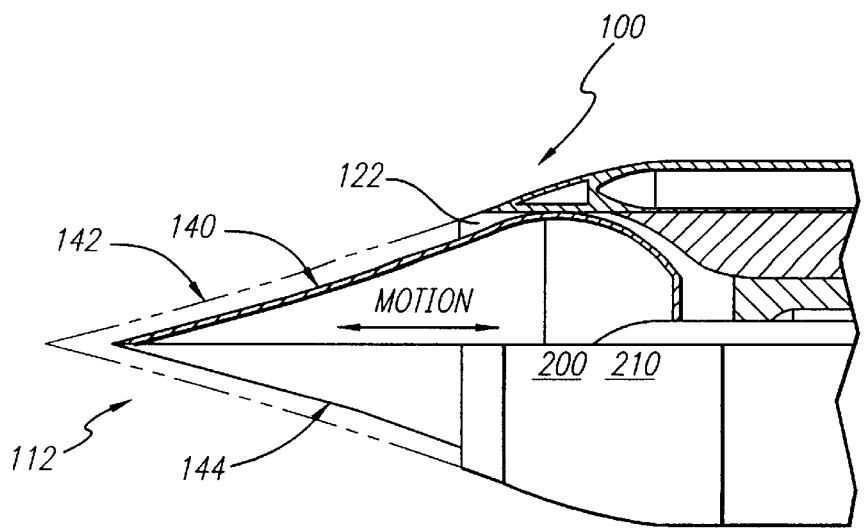
FIG. 3

ROCKET AND RAMJET POWERED HYPERSONIC STEALTH MISSILE HAVING ALTERABLE RADAR CROSS SECTION

BACKGROUND OF THE INVENTION

1. Field of the Invention

The present invention relates generally to high speed missiles, and more particularly to a missile propelled by a solid rocket fuel engine to hypersonic velocities in which the size of the inlet opening is varied through the use of an axially translatable inlet plug, sensors to determine velocity, altitude, and location of the missile, and an on-board computer for continuously repositioning the plug in the inlet opening in response to the sensed conditions. As the missile reaches a predetermined trajectory position, the inlet opening is closed to reduce thrust, to diminish the forward speed of the missile, and to cause the missile to traverse a downward trajectory toward a target, while at the same time effecting a substantial reduction in the radar cross-section of the missile.

2. Description of Related Art

Conventional ramjet engine operation entails aerodynamically compressing air in an intake duct, burning a mixture of the compressed air and fuel in a combustion chamber, and then ejecting the resulting hot gases through a propulsion nozzle where the expanding gases are discharged at a high velocity.

Detachable rocket engines have been used for many years to provide sufficient acceleration for missiles so that a high enough speed can be achieved to compress air in the intake duct to begin operation of ramjet. After the missile reaches a high enough velocity for the ramjet to be self-sustaining, the rocket engine is detached and discarded.

To save space and reduce weight, rocket grain fuel has been provided within the ramjet combustion chamber for initial acceleration of the missile (see U.S. Pat. No. 3,452,544 to Glick et al., U.S. Pat. No. 3,609,977 to McCormick, and U.S. Pat. No. 4,891,938 to Nagy et al.).

Nevertheless, the integral rocket and ramjet engine design has drawbacks. For one thing, the engine still exhibits great weight. For another thing, the propelling nozzle inlet size must be changed when the engine converts from a rocket to a ramjet.

Addressing the weight issue has largely been a matter of reducing the number of components used or finding new or alternative materials for the various required engine components. Also, new fuel materials have been developed which either are of lower specific gravity or which require fewer support systems.

The problem of altering the nozzle inlet size has largely been approached by using different engine configurations, including ones in which the inlet opening is of a fixed size and a plug is axially moved into and out of blocking relationship with the opening (see U.S. Pat. No. 4,628,688 to Keirsey). The plug movement controls the consumption of fuel, as well as the transition from rocket engine operation to ramjet engine operation.

U.S. Pat. No. 2,684,570 to Nordfors shows one version of a missile which can transition from rocket engine operation to ramjet operation. The nose 4 initially blocks the inlet nozzle, permitting normal consumption of rocket fuel. When the fuel has been consumed, the reduced pressure behind the nose combined with pressure from oncoming ambient air forces the nose forced rearwardly, thereby "ramming" air into the ramjet engine.

Another technique for addressing this problem has been to burn away the rocket nozzle during transition (see U.S. Pat. No. 4,651,523 to Adams).

The excessive weight problem has been approached through the use of fewer components, or components made of lighter materials. This entails not only components but also body parts, such as support elements and skin. However, a significant difficulty in choosing a lighter material is that it must be able to stand up to extremely high temperatures whether from ramjet engine operation or from ambient friction experienced by the craft itself while traveling at hypersonic velocities.

For example, U.S. Pat. No. 5,594,216 to Yasukama et al. teaches using a light weight acoustic material comprised of a matrix of fused silica fibers as an insert in a jet engine housing.

U.S. Pat. No. 5,413,859 to Black et al. teaches a thermal protection system (TPS) for the nose tip of a reentry space vehicle which includes a carbon-carbon nose tip having a first and second sublimatable layers at inner and outer portions of the nose tip.

U.S. Pat. No. 5,560,569 to Schmidt discloses a thermal protection system for hypersonic cruise and space launch vehicles in which a flexible outer skin is formed from a metal super alloy secured over ceramic blocks that provide both an insulation layer and support for the outer skin. The blocks are made of a composite fiber-ceramic insulation material formed of silica and alumina fibers, boron nitride, and silicon carbide.

Notwithstanding that these disclosures might ultimately lead to an appropriate solution to the foregoing drawbacks, still another problem that has not been addressed by the known prior art is that of rendering an incoming missile as invisible as possible to radar and other missile detecting systems.

Against this background of known technology, the inventor has developed a missile propelled by solid rocket fuel to hypersonic velocities in which the size of the inlet opening is varied through the use of an axially translatable plug, and a computer carried on-board the missile determines the position of the plug in the inlet opening. In this manner, as the missile reaches a predetermined trajectory location and requires redirection toward a target, the inlet opening will be closed to reduce forward speed of the missile and facilitate its downward trajectory, while at the same time substantially minimizing the discernible radar cross-section of the missile.

OBJECTS AND SUMMARY OF THE INVENTION

It is therefore an object of the present invention to provide a novel missile having a translatable plug for opening and closing the nozzle inlet opening which will overcome all the disadvantages and drawbacks of known similar payload delivery systems.

Another object of the present invention is to provide a novel system for opening and closing the inlet opening of a solid fuel missile nozzle which includes a computer means for determining the proximity of the missile to the target and for effecting closing of the nozzle inlet opening to reduce velocity of the missile and alter its trajectory toward the target.

Still another object of the present invention is to provide a solid fuel ramjet missile including an axially translatable plug element which can be movably re-positioned in the inlet of the missile to effect opening and closing of the inlet opening so as to alter the missile's radar cross section.

Still another object of the present invention is to provide a novel missile configuration which includes structural and skin components composed of cured carbon-carbon slurry so that the weight of the missile is substantially reduced.

BRIEF DESCRIPTION OF THE DRAWINGS

FIG. 1 depicts a missile structure that typifies the ramjet engine technology known prior to the present invention;

FIG. 2 is an illustration of a preferred embodiment of the hypersonic missile of the present invention; and FIG. 3 is an enlarged sectional view of the inlet portion of the missile shown in FIG. 1, and illustrating the translatable inlet plug.

DETAILED DESCRIPTION OF THE INVENTION

The following description is provided to enable any person skilled in the art to make and use the invention, and sets forth the best modes contemplated by the inventor of carrying out his invention. Various modifications, however, will remain readily apparent to those skilled in the art, since only the generic principles of the present invention have been defined herein specifically to provide teachings for a hypersonic missile that encompasses many long sought after features.

FIG. 1 depicts a conventional missile of the type shown in U.S. Pat. No. 4,651,523 to Adams (mentioned above) which combines a rocket engine with a ramjet engine. The engine of the missile includes an intake duct 18 for aerodynamically compressing air, a port cover 30, a combustion chamber 20 and a propelling nozzle 22. The port cover 30 assumes a first position in which air is prevented from entering the combustion chamber and a rocket charge 24 is burned in the combustion chamber. The port cover 30 moves axially to a second, rearward, position when the rocket charge is totally consumed to allow compressed air into the combustion chamber so that the engine can operate as a ram engine. Unlike the engine of the present invention, the Adams engine is not a dual grain solid fuel engine, but rather a solid-liquid fuel engine.

FIGS. 2 and 3 show the hypersonic missile 100 of the present invention, which is seen to include a nose portion 112, a body portion 114 housing the fuel supply, a tail portion 116, and a nozzle inlet 122.

The hypersonic solid fuel ramjet missile shown in FIGS. 2 and 3 is designed to be launched from surface to air platforms, fly extended ranges over enemy territory at velocities exceeding Mach 5, and strike protected targets at high impact velocities. The high speed of this missile is necessary to impact time-critical targets and effect damage on deeply buried targets. The success of the mission hinges on the survivability of the missile both in cruise mode and in target ingress. Enemy anti-missile fire will be directed at the missile, and the success of each mission will depend on low radar-observability.

To accomplish these objectives, the missile of the present invention uses two different types of solid propulsion fuels—a fully-oxidized boost fuel 132, and a minimally oxidized cruise fuel 134. Combustion of the boost fuel does not require airflow through the missile. However, combustion of the cruise fuel necessitates a continuous flow of air through the missile. Thus, the present invention embodies a translatable inlet nozzle plug 140 which can be moved axially between a first position (shown in dotted lines at 142) in which the inlet nozzle opening is essentially completely blocked, and a second position (shown in solid lines at 144) in which the inlet nozzle opening is sufficiently unblocked to permit a flow of ambient air through the body portion of the missile. Hydraulic, mechanical or electrical control mechanisms (shown generally at 200) are provided for coupling the inlet nozzle plug with a computing means (shown generally at 210) for determining how much fore or aft the inlet nozzle plug should be moved.

The two position inlet plug controls the combustion process by translating from the first closed position to the second open position during the ascent phase of the missile flight when the speed of the missile passes a threshold level. When the inlet nozzle opening is open, air is rammed into the nozzle opening and into the body of the missile where it combusts with the solid cruise fuel. At a desired or predetermined distance along the missile trajectory, the inlet plug is caused to travel axially forward into an inlet aperture closing position where combustion of the solid cruise fuel is inhibited, resulting in reduction of thrust and forward velocity of the missile. The device is guided to its intended target by sensor means that involve a combination of internal and external means. The internal means derives position and guidance from a set of opposed acceleration sensors coupled with a time-based position and attitude integration computer, more commonly known as an internal navigation system (INS). The external means is by derivation of time-based position and attitude from the Global Positioning System (GPS) satellite network. The combination of the receiving antenna, signal decoding computer, associated input and output mechanisms and connectors constitutes "GPS apparatus". At this point, the orientation of the missile shifts so that the nose points in a downward direction toward the target. Determination of the conditions necessary to effect shifting of the translating plug in the nozzle inlet opening so as to open or close the opening can be accomplished by a real-time calculation of the on-board computer during flight of the missile, or at the time of launch of the missile.

Translation of plug 140 also achieves a second objective of minimizing the radar cross section (RCS) of the missile. The inlet plug 140 is moved forwardly to close the inlet opening, and when the inlet plug reaches its forward most position, the inlet opening is blocked, so that the inlet cavity ordinarily seen at the front of the missile is substantially entirely eliminated. By eliminating this cavity, the radar cross section for the missile is greatly, if not virtually entirely, reduced, thereby substantially increasing the terminal phase survivability and effectiveness of the missile system.

The missile of the present invention, as shown in FIGS. 2 and 3, also provides for simultaneously substantially reducing the overall weight of the vehicle and providing an insulating mechanism for protecting the missile against the deleterious effects of high temperatures generated by passage of the missile through the ambient at hypersonic speeds.

This further objective is achieved by using a cured carbon-carbon slurry composite material for nearly all of the structural members of the missile. The terminology "carbon slurry" refers to a process by which a solid structural material is manufactured from constituent elements of base carbon filaments in macroscopically small or large sizes combined with a liquidified "slurry" of carbon powders mixed with a suitable fluid media. The process of construction employs a mold, which forms a surrounding barrier resembling the desired part on all sides. The carbon filaments (long or short) are laid into the mold, over which the "slurry" is poured. The mold and contents are then "cured" which involves heating the mixture to temperatures above room temperature for a period of time. During the curing cycle, chemical processes occur which bind and solidify the slurry mix and the carbon filaments to form a single solidified matrix. Once this has occurred, the part is brought back down to room temperature and removed from the mold in finished, solid form. This process method which utilizes macroscopically large carbon filaments to increase the strength of the finished part is known as a cured fiber reinforced slurry procedure. The invention also contemplates using the carbon-carbon slurry for the skin, the fins, the inlet plug and the exhaust nozzle. In this way, the structural and thermal insulation properties of the missile are improved, especially at speeds up to Mach 10.

By using carbon/carbon material in place of a more conventional insulated titanium frame with woven carbon/carbon leading edges, a reduction of more than 50% in weight can be achieved.

In summary, the missile of the present invention is capable of hypersonic velocities generated by its solid fuel ramjet engine, and as a result of its structure and function exhibits stealth characteristics.

The missile of the present invention can be launched from surface or air platforms, fly extended ranges over enemy territory at velocities exceeding Mach 5, and strike protected targets at high impact velocities. The high speed of this system is necessary to impact time-critical targets and effect damage on deeply buried targets. Mission success depends on survivability of the missile both in cruise mode and in target ingress. Enemy anti-aircraft missile fire will be directed at the missile of the invention and therefore low radar-observability becomes a very important parameter.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A stealthy missile adapted for flight at hypersonic velocities, comprising:

an engine capable of rocket and ramjet modes of operation; said engine having an inlet opening;

a fuel combustion chamber in said engine housing a boost fuel and a cruise fuel;

axially movable plug means, located at said engine inlet opening, for altering the size of said inlet opening; and means, coupled with said plug means and combustion means, for switching between said modes of operation of said engine during flight of said missile, so that when said missile reaches a target destination in its flight trajectory, said plug means can be moved to close the inlet opening, shut down the ramjet operation, and alter the missile radar cross section properties.

2. The stealthy missile of claim 1, wherein said switching means includes sensor means for determining flight parameters and computer means for processing said flight parameters to determine when to move said plug means.

3. The stealthy missile of claim 2, wherein said sensor means includes GPS apparatus, and said computer means includes predetermined values correlating plug means positions with said flight parameters.

4. The stealthy missile of claim 1, wherein said missile includes an outer skin and internal structural components, said skin and components being fabricated from a carbon/carbon slurry.

5. The stealthy missile of claim 4, wherein said carbon/carbon slurry of which said skin and components are made comprises a cured, fiber-reinforced, slurry.

6. The stealthy missile of claim 1, wherein said axially movable plug means has a first functional position wherein said engine operates in a rocket mode, and a second functional position wherein said engine operates in a ramjet mode.

7. The stealthy missile of claim 6, wherein said inlet opening is closed to ambient air when said axially movable plug means is in said first position.

8. The stealthy missile of claim 6, wherein said inlet opening admits ambient air when said axially movable plug means is in said second position.

9. The stealthy missile of claim 1, wherein said means for switching between said modes of operation of said engine during flight includes hydraulic control means.

10. The stealthy missile of claim 1, wherein said axially movable plug means is located substantially asymmetrical of said missile.

* * * * *